Dec. 29, 1970     T. J. PUZNIAK     3,550,390
METHOD AND APPARATUS FOR ECONOMIZING THE USE OF REFRIGERANT
Original Filed April 4, 1967
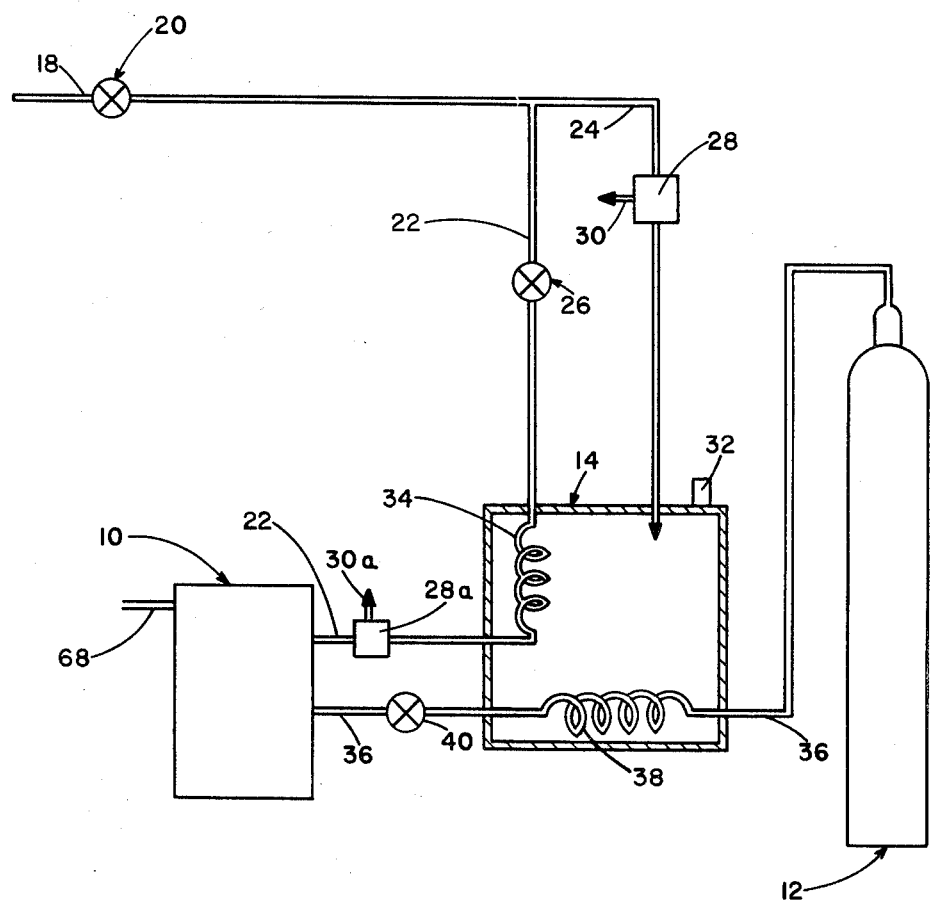
INVENTOR
THOMAS J. PUZNIAK United States Patent Office 3,550,390
Patented Dec. 29, 1970

3,550,390
METHOD AND APPARATUS FOR ECONOMIZING THE USE OF REFRIGERANT
Thomas J. Puzniak, Checwick, Pa., assignor to Gulf Research & Development Company, Pittsburgh, Pa., a corporation of Delaware
Original application Apr. 4, 1967, Ser. No. 628,384, now Patent No. 3,496,760, dated Feb. 24, 1970. Divided and this application Oct. 7, 1969, Ser. No. 864,418
Int. Cl. F25b 9/02
U.S. Cl. 62—5  10 Claims

ABSTRACT OF THE DISCLOSURE

Method and apparatus for economizing the use of refrigerant in freezing or other cooling apparatus comprising a precooler vessel through which the refrigerant passes. Pressurized service air is passed through vortex coolers to be used directly at a point of use, and to precool the precooler vessel. The point of use may utilize one or both of the refrigerant or the stream of cold air, both of which pass through the precooler vessels in coils.

---

This is a division of co-pending application Ser. No. 628,384, filed Apr. 4, 1967, and now U.S. Patent No. 3,496,760.

In many analytical procedures it is necessary to remove heat, and often it is necessary to freeze materials. One such application is disclosed and claimed in the parent patent mentioned above, wherein a sample liquid is first frozen and then allowed to thaw through its pour point. That invention provides method and apparatus to determine said pour point.

However, the present invention is not limited to pour point apparatus, or even to analytical usages, but may be used wherever it is necessary to cool or freeze materials, and it is desired to economize the use of refrigerant.

The invention comprises a precooler vessel which contains a pair of coils and to which cold air is admitted to cool the materials in the coils. Refrigerant flows through one coil from a source, such as a tank of the refrigerant, to the point of use. The second coil carries a stream of pressurized service air from a suitable source to the point of use. The cooled pressurized air delivered to the interior of the precooling vessel cools both coils. Vortex coolers are utilized to cool both the air delivered to the precooler vessel for cooling it, and to cool the air delivered through the coil in the vessel to the point of use.

The invention provides the ability to use either the refrigerant alone, the cooled air alone, or both the cooled air and the refrigerant at the point of use as required by conditions therein. For example, if the conditions are that there is a relatively large amount of time to go through the cooling or freezing cycle, and the lowest temperature needed in the point of use is higher than about −20° F., then just the cooled air alone would be sufficient. On the other hand, if relatively rapid freezing or cooling is needed, and/or the final temperature desired is lower than about −20° F., then only the refrigerant may be used. In most cases, the operating conditions will probably fall between these extremes, and some combination of cooled air and refrigerant would be needed. Here again, such a combination of conditions exist in the above mentioned parent pour point patent, to which reference may be made for a fuller explanation.

In the accompanying drawing forming a part of this disclosure, the sole figure is a block diagram of apparatus embodying the invention.

Referring now to the drawing, the invention comprises a block labelled 10 which may be an analyzer or any other point of use, a source of refrigerant 12, which may be a readily available cylinder of liquid $CO_2$, and a precooler box or vessel 14. In addition to the tank of refrigerant 12, the apparatus of the invention may also be supplied with electricity for control purposes, not shown, and is connected to a source of the usual 100 p.s.i.g. institutional service air through a pipe or conduit 18.

The flow of service air in pipe 18 is controlled by a solenoid or other type of valve 20. Downstream from valve 20, pipe 18 is divided into two pipes 22 and 24 that go to precooler 14. The flow of service air in pipe 22 is controlled by a solenoid or other valve 26. The flow of air in pipe 24 passes through a vortex cooling device 28, and then passes into the space within precooler 14. Vortex cooler 28 is a standard device which exhausts part of the air passing therethrough through an exhaust 30, and cools the remainder of the air by as much as 100° F. The vortex cooler comprises means which vortexes the air passing therethrough. The hotter, lighter, high velocity air migrates to the outside of the vortex, while the very cold, heavier low velocity air migrates to the center of the vortex. The hot air is exhausted and the cold air is passed on. One vortex cooler found to be suitable for use in the apparatus of the invention is a "Ranque–Hilsch" vortex tube, model number VT–163 A 25L with generator.

The cooled air from the pipe 24 fills precooler vessel 14 and bleeds to atmosphere through a bleeder valve 32. Pipe 22 is provided with a coil 34 positioned within precooler 14. After passing out of precooler box 14, pipe 22 is provided with a vortex cooler 28a identical to vortex cooler 28. After vortex cooler 28a, pipe 22 passes into an analyzer or other point of use 10. A pipe 36 connects the refrigerant tank 12 to the analyzer or point of use 10. A suitable $CO_2$ drier, not shown, may be provided in line 36 in the conventional manner. Pipe 36 is provided with a coil 38 positioned within the precooler vessel 14. The flow of refrigerant to the point of use is controlled by a refrigerant pulsing solenoid valve or the like 40.

Thus, by the use of the service air in pipe 18 and the precooler box 14, the liquid $CO_2$ is precooled before use, and a supply of cold air through pipe 22 is provided for the point of use. The invention is intended to maximize the efficiency of use of the refrigerant. This is desirable not from just the viewpoint of conserving the $CO_2$ or other refrigerant in the pressurized cylinders, which is relatively inexpensive, but rather from the viewpoint of maximizing the number of tests that can be run on each tank. The efficiency is gained by reducing the labor required to change tanks and the amount of time the apparatus is not in use because the refrigerant is exhausted. When the invention was used, about 500 tests of a certain kind were run on one standard tank of $CO_2$. Without the refrigerant economy apparatus of the invention, only about 60 of the same kind of tests were run on one standard tank of $CO_2$ before exhausting it. Thus, the invention reduced wasted time to less than one-eighth of what it would be without the refrigerant economy apparatus, plus an equivalent saving in the cost of $CO_2$.

The various valves 20, 26 and 40 are preferably solenoid valves when the invention is incorporated into a larger automatic apparatus. However, it will be readily appreciated by those skilled in the art that these valves could be manual. Where automatic operation is desired, the coils of the solenoid valves would be incorporated into the control circuitry dictated by the needs of the point of use 10. An example of such control circuitry is shown in FIG. 4 of and described in the above mentioned pour point patent.

In said pour point apparatus, the refrigerant economy invention is utilized as follows. First, cool air via coil 34 is supplied to the analyzer 10 to cool the sample to a first predetermined range of temperature. The air flow is then stopped and the refrigerant flow via coil 38 started to continue cooling the sample to a second predetermined range of temperature which includes the freezing point temperature of the sample. This combination is found to be a good balance between speed of freezing and economy of use of refrigerant. Other combinations, and the particular choices of the temperatures defining the two ranges will be obvious to those skilled in the art, which also makes clear the great flexibility of the present invention.

While the invention has been described in detail above, it is to be understood that this detailed description is by way of example only, and the protection granted is to be limited only within the spirit of the invention and the scope of the following claims.

I claim:

1. A method of cooling a point of use comprising the steps of cooling a first stream of pressurized air, flowing said first stream of pressurized air to a precooler to remove heat from said precooler, flowing a second stream of pressurized air through said precooler to a point of use, flowing a stream of refrigerant from a source of said refrigerant though said precooler to said point of use, and selectively controlling said second stream of pressurized air and said stream of refrigerant flowing to said point of use.

2. The method of claim 1, and further cooling said second stream of pressurized air after it flows out of said precooler and before it flows to said point of use.

3. The method of claim 1, wherein said first stream of air is cooled by flowing it through a vortex cooler.

4. The method of claim 2, wherein said second stream of air is cooled by flowing it through a vortex cooler.

5. A method of cooling comprising the steps of flowing a coolant into a precooler vessel to cool said vessel, flawing a stream of air thronugh said precooler vessel to precool said stream of air, flowing said stream of air from said precooler vessel to a point of use, continuing the flow of said stream of air through said precooler vessel and to said point of use until the temperature at said point of use arrives at a first predetermined range of temperature, and then stopping the flow of said stream of air to said point of use, and flowing a refrigerant through said precooler vessel and to said point of use after the temperature at said point of use is at said first predetermined range of temperature to bring the temperature at said point of use to a second predetermined range of temperature, and said second predetermined range of temperature being lower than said first predetermined range of temperature.

6. The method of claim 5, and further cooling said stream of air after it flows out of said precooler vessel and before it flows to said point of use.

7. In combination, a precooler vessel, first conduit means connecting the inside of said precooler vessel to a source of pressurized air including means to cool the flow of air passing therethrough before passing said air into precooler vessel to cool said vessel, a source of refrigerant, means to flow refrigerant from said source of refrigerant through said precooler vessel to precool the refrigerant and then to flow the refrigerant from said precooler vessel to a point of use, second conduit means adapted to flow air from a source of pressurized air through said precooler vessel and to said point of use, and control means to selectively control the flow of air through said first and second conduit means and to control the flow of said refrigerant.

8. The method of claim 7, said means to cool the air in said first conduit means comprising a vortex cooler.

9. The method of claim 7, each of said second conduit means and said refrigerant flow means including a coil positioned within said precooler vessel.

10. The method of claim 7, said second conduit means including a vortex cooler therein positioned between said precooler vessel and said point of use.

References Cited

UNITED STATES PATENTS

| | | | |
|---|---|---|---|
| 1,863,578 | 6/1932 | Morse | 62—122 |
| 1,952,281 | 3/1934 | Rougue | 62—5 |
| 2,522,787 | 9/1950 | Hughes | 62—5 |
| 3,307,366 | 3/1967 | Smith | 62—5 |

WILLIAM J. WYE, Primary Examiner

U.S. Cl. X.R.

62—122